United States Patent [19]

Kao et al.

[11] Patent Number: 5,288,933
[45] Date of Patent: Feb. 22, 1994

[54] PROCESS FOR THE PRODUCTION OF POLYETHYLENE

[75] Inventors: Sun-Chueh Kao; Frederick J. Karol, both of Belle Mead, N.J.

[73] Assignee: Union Carbide Chemicals & Plastics Technology Corporation, Danbury, Conn.

[21] Appl. No.: 868,860

[22] Filed: Apr. 16, 1992

[51] Int. Cl.$^5$ .............................................. C07C 2/36
[52] U.S. Cl. .................................. 585/513; 502/117; 585/502; 585/512; 585/524; 585/525
[58] Field of Search ............... 585/502, 506, 509, 524, 585/512, 513; 502/117

[56] References Cited

U.S. PATENT DOCUMENTS

| | | | |
|---|---|---|---|
| 4,302,565 | 11/1981 | Goeke et al. | 526/88 |
| 4,657,882 | 4/1987 | Karayannis et al. | 502/115 |
| 4,886,771 | 12/1989 | Kao et al. | 502/121 |
| 4,988,784 | 1/1991 | Kao et al. | 526/133 |
| 5,064,795 | 11/1991 | McDaniel | 502/104 |

FOREIGN PATENT DOCUMENTS 8703887  12/1986  World Int. Prop. O. .......... 502/117

Primary Examiner—Asok Pal
Attorney, Agent, or Firm—Saul R. Bresch

[57] ABSTRACT

A process for the polymerization of ethylene or a mixture comprising ethylene and one or more alpha-olefins and, optionally, a diene, comprising passing, under polymerization conditions, the aforementioned monomer(s) into contact with a catalyst system comprising:
(a) the reaction product of
 (i) a titanium based catalyst precursor having the formula $Mg_aTi(OR)_bX_c(ED)_d$ wherein
 ED is an inside electron donor comprising a mixture of (A) about 1 to about 80 mole percent of an alkyl, alkoxy, aryl, or aryloxy phosphine oxide, or mixtures thereof, and (B) about 20 to about 99 mole percent of an organic ester, ether, or ketone, or mixtures thereof, said phosphine oxide also being present in a molar ratio of phosphine oxide to titanium of 0.1:1 to 8:1;
 R is an aliphatic or aromatic hydrocarbon radical having 1 to 14 carbon atoms of COR' wherein R' is an aliphatic or aromatic hydrocarbon radical having 1 to 14 carbon atoms;
 each OR group is the same or different;
 each X is independently chlorine, bromine, or iodine;
 wherein component (a) is impregnated into an inorganic support; and
(b) a hydrocarbyl aluminum cocatalyst.

8 Claims, No Drawings

PROCESS FOR THE PRODUCTION OF POLYETHYLENE

TECHNICAL FIELD

This invention relates to a process for the production of polyethylene having a relatively low melt flow ratio.

BACKGROUND INFORMATION

The catalyst system disclosed in U.S. Pat. No. 4,302,565 includes a precursor containing magnesium, titanium, a halogen, and an electron donor, and is found to be quite useful in the production of polymers, which are advantageously used in injection molding. These polymers are characterized by relatively high densities, low melt flow ratios, and narrow molecular weight distributions, and the catalyst system is characterized by high activity. Melt flow ratio is the ratio of flow index to melt index. Melt index is determined under ASTM D-1238, Condition E. It is measured at 190° C. and reported as grams per 10 minutes. Flow index is determined under ASTM D-1238, Condition F. It is measured at 10 times the weight used in the melt index text above and reported in the same manner, i.e., grams per 10 minutes.

While the characteristics of the catalyst system and the polymers produced using same are of commercial significance, there is a need for a catalyst system which can provide polymers having still lower melt flow ratios and, when molded or extruded, improved physical properties including higher dart drop, lower hexane extractables, and high impact strength, without sacrifice in the high activity aspect of the catalyst system or even with some improvement.

It was found that lower melt flow ratios could be achieved, for example, by substituting trimethylaluminum for triethylaluminum as a catalyst activator or modifier, but there was a loss in catalyst activity, and the trimethylaluminum was very expensive when compared to triethylaluminum and highly pyrophoric. Other attempts at achieving lower melt flow ratios were similarly frustrated.

DISCLOSURE OF THE INVENTION

An object of this invention, therefore, is to provide a process for the production of polyethylene in which the catalyst system will have at least as high activity as similar magnesium/titanium based catalysts and the polymer product will have the low melt flow ratios desirable for injection molding applications. Other objects and advantages will become apparent hereinafter.

According to the present invention, it has been found that the replacement of the electron donor in a conventional titanium based catalyst precursor with a defined amount of a phosphine oxide compound fulfills the above object.

The invention, then, lies in a process for the polymerization of ethylene or a mixture comprising ethylene and one or more alpha-olefins and, optionally, a diene, has been discovered, which comprises passing, under polymerization conditions, the aforementioned monomer(s) into contact with a catalyst system comprising:

(a) the reaction product of
(i) a titanium based catalyst precursor having the formula $Mg_a Ti(OR)_b X_c (ED)_d$ wherein ED is an inside electron donor comprising about 1 to about 80 mole percent of an alkyl, alkoxy, aryl, or aryloxy phosphine oxide, or mixtures thereof, based on the total amount of inside electron donor, said phosphine oxide also being present in a molar ratio of phosphine oxide to titanium of 0.1:1 to 8:1;

R is an aliphatic or aromatic hydrocarbon radical having 1 to 14 carbon atoms or COR' wherein R' is an aliphatic or aromatic hydrocarbon radical having 1 to 14 carbon atoms;

each OR group is the same or different;

each X is independently chlorine, bromine, or iodine;

$a$ is 0.5 to 56;

$b$ is 0, 1, or 2;

$c$ is 2 to 116; and $d$ is 2 to 85;

(ii) at least one activator having the formula

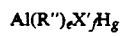

wherein $X'$ is Cl or OR'''

$R''$ and $R'''$ are the same or different and are saturated hydrocarbon radicals having 1 to 14 carbon atoms $f = 0$ to 1.5

$g = 0$ or 1

$e + f + g = 3$ wherein component (a) is impregnated into an inorganic support; and (b) a hydrocarbyl aluminum cocatalyst.

DESCRIPTION OF THE PREFERRED EMBODIMENTS

The titanium based catalyst and its method for preparation, except with respect to the phosphine oxide, are disclosed in U.S. Pat. No. 4,302,565, mentioned above. The catalyst precursor can be prepared from a titanium compound, a magnesium compound, and an electron donor.

Titanium compounds, which are useful in preparing these precursors, have the formula $Ti(OR)_b X_h$ wherein R, X and b are as defined above for component (a); h is an integer from 1 to 4; and $b+h$ is 3 or 4. Examples of titanium compounds are $TiCl_3$, $TiCl_4$, $Ti(OC_2H_5)_2Br_2$, $Ti(OC_5H_5)Cl_3$, $Ti(OCOCH_3)Cl_3$, and $Ti(OCOC_6H_5)Cl_3$.

The magnesium compounds, useful in preparing the precursors, include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds. The halogen and OR groups, if any, are found in the magnesium and titanium compounds.

The electron donor which is used initially to prepare the precursor, is a liquid organic Lewis base in which the titanium and magnesium compounds are soluble.

The electron donor compounds include such compounds as alkyl esters of aliphatic and aromatic carboxylic acids, aliphatic ethers, cyclic ethers and aliphatic ketones. Among these electron donor compounds, the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ethers; $C_3$ to $C_6$, and preferably $C_3$ to $C_4$, aliphatic ketones. The most preferred of these electron donor compounds would include methyl formate, ethyl acetate, butyl acetate, ethyl ether, hexyl ether, tetrahydrofuran, dioxane, acetone and methyl isobutyl ketone. Mixtures of electron donor compounds can be used, if desired.

The activator has the formula $Al(R')_eX'_fH_g$ wherein $X'$ is Cl or $OR'''$; $R''$ and $R'''$ are the same or different and are $C_1$ to $C_{14}$ saturated hydrocarbon radicals; $f=0$ to 1.5; $g=0$ or 1; and $e+f+g=3$. Mixtures of activators can be used, if desired. The activators are exemplified by the hydrocarbyl aluminum compounds mentioned below and by diethylaluminum chloride (DEAC), triethylaluminum chloride, and diethyl ethoxy aluminum. A preferred activator is DEAC.

The hydrocarbyl aluminum cocatalyst can be represented by the formula $R_3Al$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms.

Examples of hydrocarbyl aluminum compounds are as follows: triisobutylaluminum, trihexylaluminum, di-isobutylaluminum hydride, dihexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred cocatalysts are triethylaluminum, triisobutylaluminum, trihexylaluminum, di-isobutylaluminum hydride, and dihexylaluminum hydride. Another useful cocatalyst is methyl aluminoxane.

The reaction product of the precursor, the activator, and the phosphine oxide is impregnated into an inorganic support. A preferred support is silica. Other suitable supports are inorganic oxides such as aluminum phosphate, alumina, silica/alumina mixtures, silica modified with an organoaluminum compound such as triethylaluminum, and silica modified with diethylzinc. A typical support is a solid, particulate, porous material essentially inert to the polymerization. It is used as a dry powder having an average particle size of about 10 to about 250 microns and preferably about 30 to about 100 microns; a surface area of at least about 200 square meters per gram and preferably at least about 250 square meters per gram; and a pore size of at least about 80 Angstroms and preferably at least about 200 Angstroms. Generally, the amount of support used is that which will provide about 0.1 to about 0.5 millimole of titanium per gram of support and preferably about 0.2 to about 0.3 millimole of titanium per gram of support. Impregnation of the above mentioned catalyst precursor into a silica support can be accomplished by mixing the complex and silica gel in the electron donor solvent followed by solvent removal under reduced pressure.

The preparation of the reaction product and its impregnation into an inorganic support are typically carried out in a mix tank in slurry form at a temperature in the range of about 0° C. to about 60° C., and preferably in the range of about 25° C. to about 40° C. The slurry can be formed using various inert liquid mediums, usually saturated hydrocarbons, such as anhydrous hexane, heptane, and isopentane. The phosphine oxide and the activator are generally dissolved in the liquid medium before they are added to the mix tank. The order of addition to the mix tank can be as follows: (1) supported precursor, (2) phosphine oxide, and (3) activator or (1) supported precursor, (2) activator, and (3) phosphine oxide. The reaction is preferably carried out in an inert atmosphere and is followed by using a vacuum or a nitrogen purge to remove the diluent, as well as the replaced electron donor, and produce a free flowing powder.

About 1 to about 80 mole percent of the electron donor is replaced by the phosphine oxide, and preferably about 50 to about 80 mole percent of the electron donor is replaced by the phosphine oxide. It is important to note that the replacement of electron donor with the phosphine oxide is accomplished by the reaction of the Phosphine oxide with the supported precursor to form, along with the activator, the supported catalyst. The independent addition of the phosphine oxide to the polymerization reactor is not effective in accomplishing the object of this invention. The molar ratio of phosphine oxide to titanium is also important, a molar ratio of 0.1:1 to 8:1, and preferably 1:1 to 6:1, being suitable.

As noted above, the phosphine oxide is an alkyl, alkoxy, aryl, or aryloxy phosphine oxide, or mixtures thereof. The alkoxy and aryloxy phosphine oxides can also be referred to as phosphates.

The phosphine oxide can have the following formula:

wherein R is an alkyl or alkoxy radical having 1 to 14 carbon atoms, preferably 1 to 8 carbon atoms, an aryl or aryloxy radical, or hydrogen; each R is the same or different; and no more than two R's are hydrogen. The R radicals can be variously substituted with the proviso that the substituent does not affect the replacement of the electron donor.

Examples of suitable phosphine oxides are tributyl phosphine oxide, which is preferred, triethyl phosphine oxide, triphenyl phosphine oxide, tribenzyl phosphine oxide, tri-n-propyl phosphine oxide, triocytl phosphine oxide, tricyclohexyl phosphine oxide, trimethyl phosphate, triethyl phosphate, tributyl phosphate, tri-n-amyl phosphate, trihexyl phosphate, triphenyl phosphate, and tricresyl phosphate.

The cocatalyst is preferably added separately neat or as a solution in an inert solvent, such as isopentane, to the polymerization reactor at the same time as the flow of ethylene is initiated.

The ethylene polymerization can be conducted in the gas phase or liquid phase using conventional techniques such as fluidized bed, slurry, or solution processes. A continuous, fluidized bed process is preferred. Whatever the process, the supported catalyst, the cocatalyst, a diluent if a slurry or solution process is used, ethylene, and the comonomer(s), if any, are introduced into a suitable reactor at temperatures in the range of about 10° C. to about 160° C. depending on the process selected. Preferred operating temperatures will vary depending on the density desired. A typical slurry polymerization is described in U.S. Pat. No. 4,988,784. A typical fluidized bed process is described in U.S. Pat. No. 4,302,565, and a typical fluidized bed reactor is described in U.S. Pat. No. 4,482,687.

Useful comonomers are alpha-olefins having 3 to 12 carbon atoms, and preferably 3 to 8 carbon atoms, exemplified by propylene, 1-butene, 1-hexene, 4-methyl-1-pentene, and 1-octene. Dienes such as butadiene, ethylidene norbornene, 1,4-hexadiene, 1,6-octadiene, and 1,8 decadiene can also be used, usually as the third comonomer.

The use of more than one reactor, connected in series, enhances the intermediate molecular weight distribution.

A chain transfer agent, such as hydrogen, can be used to terminate the polymer chain. Usually the ratio of hydrogen to ethylene will vary between about 0.001 to about 2.0 moles of hydrogen per mole of ethylene.

The patents mentioned in this specification are incorporated by reference herein.

The invention is illustrated by the following examples.

EXAMPLES 1 TO 21

Catalyst A is prepared as follows: A magnesium chloride/titanium chloride/tetrahydrofuran (THF) complex is impregnated into a triethylaluminum (TEAL) treated silica support from a solution of THF. The silica is first dried at 600° C. to remove water and most of the surface silanols, and chemically treated with TEAL to further passivate the remaining silanols. The dried free flowing precursor is then further reduced with the activator, diethyl aluminum chloride (DEAC), in THF solution and dried.

Catalyst B is prepared as follows:

mixed catalyst components before the resulting mixture is transferred to the reactor. Anhydrous conditions are maintained at all times.

The polymerization reactor is dried by heating at 96° C. under a stream of dry nitrogen for 40 minutes. After cooling the reactor to 50° C., 500 milliliters of hexane are added to the reactor, and the reactor contents are stirred under a gentle flow of nitrogen. The premixed catalyst components are then transferred to the reactor under a stream of nitrogen and the reactor is sealed. The temperature of the reactor is gradually raised to 60° C. and the reactor is pressurized with hydrogen to a pressure of 20 psi. The temperature is then raised to 75° C. and the reactor is pressurized to 150 psi with ethylene. Heating is continued until the desired polymerization temperature of 85° C. is attained. Polymerization is allowed to continue for 30 minutes, during which time ethylene is continually added to the reactor to maintain the pressure constant. At the end of 30 minutes, the reactor is vented and opened.

The cocatalyst, mentioned above, is provided in an atomic ratio of aluminum to titanium of 40:1.

In Examples 4 and 13, tributyl phosphine oxide (TBPO) is added to the reactor separately prior to sealing to provide a atomic ratio of TBPO to titanium of 6:1.

Variables and results are set forth in the Table.

TABLE

| EXAMPLE | CATALYST | TBPO/Ti | THF/Ti | % THF REPLACED | CO-CATALYST | $H_2$ (psi) | 1-HEXENE (ml) | ACTIVITY | % CHANGE | MI | MFR | DENSITY |
|---|---|---|---|---|---|---|---|---|---|---|---|---|
| 1  | A | 0 | 7.5 | —  | TEAL | 20 | 0  | 1330 | —   | 0.7  | 27.1 | 0.9657 |
| 2  | B | 4 | 3.1 | 58 | TEAL | 20 | 0  | 1949 | 47  | 0.67 | 25.1 | 0.9607 |
| 3  | B | 6 | 2.0 | 73 | TEAL | 20 | 0  | 4054 | 205 | 0.8  | 23.9 | 0.9601 |
| 4  | A | 0 | 7.5 | —  | TEAL | 20 | 0  | 1066 | −20 | 0.55 | 26.9 | —      |
| 5  | A | 0 | 7.5 | —  | TIBA | 20 | 0  | 1157 | —   | 0.25 | 35.6 | 0.9608 |
| 6  | B | 6 | 2.0 | 73 | TIBA | 20 | 0  | 3181 | 175 | 0.5  | 25.2 | 0.9578 |
| 7  | A | 0 | 7.5 | —  | TEAL | 20 | 10 | 3719 | —   | 0.4  | 25.5 | —      |
| 8  | B | 6 | 2.0 | 73 | TEAL | 20 | 10 | 5204 | 40  | 0.66 | 20.6 | 0.9495 |
| 9  | A | 0 | 7.5 | —  | TEAL | 20 | 20 | 3853 | —   | 1.1  | 26   | 0.9439 |
| 10 | B | 4 | 3.1 | 58 | TEAL | 20 | 20 | 3724 | −3  | 1.9  | 23.1 | 0.9459 |
| 11 | B | 6 | 2.0 | 73 | TEAL | 20 | 20 | 5167 | 34  | 1.6  | 22.4 | 0.9459 |
| 12 | B | 8 | 1.0 | 87 | TEAL | 20 | 20 | 1942 | −50 | 1.67 | 20.4 | 0.9520 |
| 13 | A | 0 | 7.5 | —  | TEAL | 20 | 20 | 2179 | −43 | 1.4  | 25   | —      |
| 14 | A | 0 | 7.5 | —  | MAO  | 20 | 20 | 3898 | —   | 1    | 26.7 | 0.9452 |
| 15 | B | 6 | 2.0 | 73 | MAO  | 20 | 20 | 4067 | 4   | 0.7  | 22.8 | 0.9461 |
| 16 | A | 0 | 7.5 | —  | TIBA | 20 | 20 | 3627 | —   | 1.5  | 25.8 | 0.9467 |
| 17 | B | 6 | 2.0 | 73 | TIBA | 20 | 20 | 4021 | 11  | 1.7  | 22.8 | 0.9478 |
| 18 | A | 0 | 7.5 | —  | TEAL | 20 | 40 | 5175 | —   | 2    | 25.1 | 0.9371 |
| 19 | B | 6 | 2.0 | 73 | TEAL | 20 | 40 | 4882 | −6  | 2    | 22.5 | 0.9395 |
| 20 | A | 0 | 7.5 | —  | TEAL | 10 | 60 | 6624 | —   | 0.46 | 26.7 | 0.9361 |
| 21 | B | 6 | 2.0 | 73 | TEAL | 10 | 60 | 5992 | −10 | 0.36 | 23.2 | 0.9373 |

5 grams of Catalyst A are slurried in 50 milliliters of anhydrous hexane. The slurry is continuously stirred with a 0.5 molar solution of tributyl phosphine oxide in anhydrous hexane being added over a period of 5 minutes. After addition of the solution is completed, the mixture is stirred for an additional 30 to 60 minutes. At the end of this time, the mixture is heated at a temperature of 50° C., either under vacuum or under a purge of dry nitrogen, to remove the hexane diluent and replaced tetrahydrofuran and produce a free flowing powder.

Slurry polymerization:

Catalyst A or Catalyst B are employed together with a cocatalyst to homopolymerize ethylene in Examples 1 to 6 and to copolymerize ethylene and 1-hexene in Examples 7 to 21 in a one-liter autoclave reactor.

In each polymerization, the two catalyst components are premixed in a 6 ounce bottle containing 100 milliliters of hexane before being added to the reactor. Twenty milliliters of hexene-1 are added to the pre-

We claim:

1. A process for the polymerization of ethylene or a mixture comprising ethylene and one or more alpha-olefins and, optionally, a diene, comprising passing, under polymerization conditions, the aforementioned monomer(s) into contact with a catalyst system comprising:
   (a) the reaction product of
      (i) a titanium based catalyst precursor having the formula $Mg_aTi(OR)_bX_c(ED)_d$ wherein
      ED is an inside electron donor comprising a mixture of (A) about 1 to about 80 mole percent of an alkyl, alkoxy, aryl, or aryloxy phosphine oxide, or mixtures thereof, and (B) about 20 to about 99 mole percent of an organic ester, ether, or ketone, or mixtures thereof said phosphine oxide also being present in a molar ratio of phosphine oxide to titanium of 0.1:1 to 8:1;

R is an aliphatic or aromatic hydrocarbon radical having 1 to 14 carbon atoms or COR' wherein R' is an aliphatic or aromatic hydrocarbon radical having 1 to 14 carbon atoms;

each OR group is the same or different;

each X is independently chlorine, bromine, or iodine;

a is 0.5 to 56;

b is 0,1, or 2;

c is 2 to 116; and d is 2 to 85; and (ii) at least one activator having the formula $$Al(R'')_e X'_f H_g$$

wherein

X' is Cl or OR'''

R'' and R''' are the same or different and are saturated hydrocarbon radicals having 1 to 14 carbon atoms f = 0 to 1.5 g = 0 or 1 e + f + g + = 3 wherein component (a) is impregnated into an inorganic support; and (b) a hydrocarbyl aluminum cocatalyst.

2. The process defined in claim 1 wherein component (B) is tetrahydrofuran.

3. The process defined in claim 1 wherein the activator is diethylaluminum chloride.

4. The process defined in claim 1 wherein the phosphine oxide is present in an amount of 50 to about 80 mole percent and component (B) is present in an amount of about 20 to about 50 mole percent.

5. The process defined in claim 1 wherein the phosphine oxide is a trialkyl phosphine oxide.

6. The process defined in claim 5 wherein the phosphine oxide is tributyl phosphine oxide.

7. The process defined in claim 1 wherein the phosphine oxide has the following formula:

wherein R is an alkyl or alkoxy radical having 1 to 14 carbon atoms, an aryl or aryloxy radical, or hydrogen; each R is the same of different; and no more than two R's are hydrogen.

8. A process for the polymerization of ethylene or a mixture comprising ethylene and one or more alpha-olefins having 3 to 8 carbon atoms and, optionally, a diene, comprising passing, under polymerization conditions, the aforementioned monomer(s) into contact with a catalyst system comprising:

(a) the reaction product of (i) a titanium based catalyst precursor having the formula $Mg_a Ti(OR)_b X_c (ED)_d$ wherein ED is an inside electron donor consisting essentially of a mixture of (A) tributyl phosphine oxide in an amount of about 50 to about 80 mole percent, and (B) tetrahydrofuran in an amount of about 20 to about 50 mole percent, said phosphine oxide also being present in a molar ratio of phosphine oxide to titanium of 0.1:1 to 6;1;

R is an aliphatic or aromatic hydrocarbon radical having 1 to 14 carbon atoms or COR' wherein R' is an aliphatic or aromatic hydrocarbon radical having 1 to 14 carbon atoms; each OR group is the same or different each X is independently chlorine, bromine, or iodine;

a is 0.5 to 56;

b is 0,1, or 2;

c is 2 to 116; and d is 2 to 85; and (ii) at least one activator having the formula $$Al(R'')_e X'_f H_g$$

wherein

X' is Cl or OR'''

R'' and R''' are the same or different and are saturated hydrocarbon radicals having 1 to 14 carbon atoms f = 0 to 1.5 g = 0 or 1 e + f + g + = 3 wherein component (a) is impregnated into a silica support; and (b) a trialkyl aluminum cocatalyst.

* * * * *